US006229716B1

(12) United States Patent
Preller (10) Patent No.: US 6,229,716 B1
(45) Date of Patent: May 8, 2001

(54) VOLTAGE APPARATUS HAVING A SWITCHING ELEMENT RECEIVING DRIVING PULSES HAVING A DURATION AND A STARTING TIME THAT ARE DEPENDENT UPON A LOAD

(75) Inventor: Peter Preller, München (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/491,314

(22) Filed: Jan. 25, 2000

Related U.S. Application Data

(63) Continuation of application No. PCT/DE98/02096, filed on Jul. 24, 1998.

(30) Foreign Application Priority Data

Jul. 25, 1997 (DE) ............................................. 197 32 169

(51) Int. Cl.[7] .................................................. H02M 3/335
(52) U.S. Cl. ................................................ 363/19; 363/97
(58) Field of Search ................................. 363/21, 20, 16, 363/95, 97, 123, 131, 74, 80, 77, 78

(56) References Cited

U.S. PATENT DOCUMENTS

| 4,450,541 | 5/1984 | Tietjen . |
| 4,593,347 | 6/1986 | Peruth et al. . |
| 5,513,089 | * 4/1996 | Sudo et al. ............................. 363/21 |

FOREIGN PATENT DOCUMENTS

3312209A1   10/1984   (DE) .

OTHER PUBLICATIONS

IBM Technical Disclosure Bulletin, vol. 31, No. 10, Mar. 1989.

* cited by examiner

Primary Examiner—Peter S. Wong
Assistant Examiner—Gary L. Laxton
(74) Attorney, Agent, or Firm—Herbert L. Lerner; Laurence A. Greenberg; Werner H. Stemer (57) ABSTRACT

An apparatus for supplying a DC voltage to a load which can be connected to output terminals. The apparatus has a semiconductor switching element for a clocked application of a supply voltage to a primary of a transformer on the basis of a sequence of driving pulses applied to a control input of the semiconductor switching element. A driving circuit is provided for producing driving pulses. The driving circuit has a first input terminal for receiving an analog load-dependent control signal which is produced by a measuring configuration and governs a duration of the individual driving pulses. The driving circuit also has a second input terminal for receiving a starting signal defining turn-on instants of the driving pulses. The apparatus further has a pulse generator with an output terminal, connected to the input terminal of the driving circuit, for providing the pulsed starting signal on the basis of a control signal. The control signal is also supplied to a first input terminal of the pulse generator, in which pulse generator, the temporal spacing of the individual pulses of the starting signal can be influenced by the control signal.

14 Claims, 12 Drawing Sheets

VOLTAGE APPARATUS HAVING A SWITCHING ELEMENT RECEIVING DRIVING PULSES HAVING A DURATION AND A STARTING TIME THAT ARE DEPENDENT UPON A LOAD

CROSS-REFERENCE TO RELATED APPLICATION

This is a continuation of copending International Application PCT/DE98/02096, filed Jul. 24, 1998, which designated the United States.

BACKGROUND OF THE INVENTION

Field of the Invention

The present invention relates to an apparatus for supplying a DC voltage to a load that can be connected to output terminals. The apparatus has a semiconductor switching element for the clocked application of a supply voltage to a primary of a transformer on the basis of a sequence of driving pulses applied to a control input of the semiconductor switching element. A driving circuit for producing the driving pulses is also provided. The driving circuit has a first input terminal for applying an analog load-dependent control signal which is produced by a measuring configuration and governs the duration of the individual driving pulses, and a second input terminal for applying a starting signal defining the turn-on instants of the driving pulses.

SUMMARY OF THE INVENTION

It is accordingly an object of the invention to provide an apparatus for supplying a DC voltage which overcomes the above-mentioned disadvantages of the prior art devices of this general type.

With the foregoing and other objects in view there is provided, in accordance with the invention, an apparatus having output terminals for supplying a DC voltage to a load connected the output terminals of the apparatus, containing:

- a measuring configuration for generating and outputting an analog load-dependent control signal;
- a pulse generator having an input terminal receiving the analog load-dependent control signal and an output terminal, the pulse generator generating and outputting at the output terminal a pulsed starting signal on a basis of the analog load-dependent control signal, a temporal spacing of individual pulses of the pulsed starting signal being influenced by the analog load-dependent control signal;
- a driving circuit for generating and outputting driving pulses, the driving circuit having a first input terminal receiving the analog load-dependent control signal from the measuring configuration, the analog load-dependent control signal governing a duration of the driving pulses, and a second input terminal connected to the output terminal of the pulse generator and receiving the pulsed starting signal for defining turn-on instants of the driving pulses;
- a supply voltage;
- a transformer having a primary side connected to the supply voltage; and
- a semiconductor switching element having a control input receiving the driving pulses from the driving circuit, the driving pulses controlling a clocked application of the supply voltage to the primary side of the transformer on a basis of a sequence of the driving pulses applied to the control input.

The object of such apparatuses used in free-running switchedmode power supplies is to provide an at least approximately load-independent output voltage at the output terminals. In this case, the output terminals are usually connected to terminals of a secondary of the transformer via a rectifier configuration. The output voltage depends not only on the load but also on the power transmitted from the primary to the secondary. If the load is reduced, the transmitted power needs to be reduced, and, if the load is increased, the transmitted power needs to be increased in order to maintain a particular output voltage in each case. The transmitted power derives from the temporal average of the energy consumed by the primary when the semiconductor switching element is on and the energy transmitted to the secondary when the semiconductor switching element is off, the energy consumed being greater the longer the semiconductor switching element is on in each case.

The durations for which the semiconductor switching element is turned on are determined by driving pulses produced by the driving circuit on the basis of the load-dependent control signal. The variable duration of the driving pulses determines the charging time of the primary, that is to say the period of time for which the primary is connected to the supply voltage for consuming energy. In this case, the following applies: the smaller the load, the lower the power to be transmitted and, usually, the shorter the driving pulses, and vice versa.

The discharging time, that is to say the period of time during which the primary transmits energy to the secondary, depends on the energy stored during the charging time and thus on the duration of the driving pulses. To prevent the semiconductor switching element from turning on during the discharging time, known apparatuses are provided with a primary signal in order to minimize switching losses, and this primary signal is used to derive the instants at which the primary is free of energy or voltage, and it is taken into account for producing the driving pulses.

Known apparatuses are usually configured such that the starting signal is derived directly from the primary signal and is selected to be such that the driving pulses start, at the end of the discharging time, at the next instant at which the primary is free of voltage. Note that the instants at which the primary is free of voltage are called zero-voltage instants below.

Turning on at the end of the discharging time calls for the switching frequency, determined by the temporal spacing of the individual driving pulses, to increase for decreasing loads. With a decreasing load, the duration of the driving pulses (which is the same as the charging time for the primary) is reduced, which results in that the energy consumption is also reduced and the discharging time and the temporal spacing between the individual driving pulses are reduced. Since switching losses are significantly increased as the switching frequency rises, the efficiency of the apparatus is significantly reduced as the load becomes smaller.

The object of the present invention is to provide an apparatus for supplying a DC voltage to a load, in which the switching frequency does not exceed a predeterminable value with a decreasing load, so that, in particular, the aforementioned disadvantages do not arise.

The object is achieved by the apparatus mentioned in the introduction, which additionally has the feature of the pulse generator having the output terminal. The output terminal is connected to the second input terminal of the driving circuit, for providing the pulsed starting signal on the basis of the control signal, which is also supplied to a first input terminal of the pulse generator, in which configuration the temporal spacing of the individual pulses of the starting signal can be influenced by the control signal. Besides the duration of the driving pulses, the temporal spacing of the driving pulses is also dependent on the load-dependent control signal in the apparatus according to the invention. The turn-on instants of the driving pulses, and thus the switching frequency, are determined by the pulsed starting signal produced by the pulse generator, whose frequency is influenced by the load-dependent control signal.

The pulse generator preferably has a voltage/time converter unit that produces a pulse-width-modulated signal on the basis of a modified control signal that is applied to an input terminal and is dependent on the control signal. The duration of the individual pulses of the pulse-width-modulated signal depends on the amplitude of the modified control signal; this modified control signal can, as proposed in one embodiment of the invention, be the same as the control signal which is supplied by the measuring configuration and is applied to the first input terminal of the pulse generator. The pulse-width-modulated signal releases the starting signal, i.e. the pulse-width-modulated signal determines the instants after which the pulses of the starting signal, and thus the driving pulses, are to be produced as soon as possible. Without any restriction of the general nature, it is assumed below that a small load results in a large control signal, with the durations of the pulses of the pulse-width-modulated signal in each case being longer the larger the control signal, and vice versa.

To reduce switching losses, it is desirable to turn on the semiconductor switching element using the driving pulses at zero-voltage instants of the primary. To produce pulses of the starting signal only at these instants, the pulse generator has detection devices for detecting the zero-voltage instants from a primary signal and for supplying a pulse signal which, by way of example, includes a series of pulses of predetermined duration. The timing of the pulses preferably matches that of the detected zero-voltage instants. The primary signal depends on a voltage produced across the primary and is supplied to the pulse generator, preferably via a second input terminal. The pulse generator also has logic devices that produce pulses of the starting signal after a predetermined edge of the pulse-width-modulated signal has been encountered at a predetermined one of the detected zero-voltage instants.

The logic device is preferably configured such that it produces the individual pulses of the starting signal immediately at the next zero-voltage instant after a falling edge of the pulse-width-modulated signal. For this, the logic device advantageously has an AND gate which is supplied with the pulse-width-modulated signal and the pulse signal provided by the detection device for producing the starting signal.

With large loads, and hence a small control signal, the pulse generator produces a pulse-width-modulated signal with pulses of short duration, and thus a starting signal with short temporal spacings between the individual pulses. Since the individual pulses of the starting signal are produced at zero-voltage instants, the maximum spacing between the individual pulses, and hence the maximum frequency of the starting signal, depends on the discharging time of the primary. With large loads, the apparatus behaves like known apparatuses of this type.

With small loads, and hence a large control signal, the pulse generator produces a pulse-width-modulated signal with pulses of long duration, and thus a starting signal with correspondingly long spacings between the individual pulses, and the switching frequency is reduced. A capacitor usually connected in parallel with the load path of the semiconductor switching element produces so-called free transformer oscillations between the capacitor and the primary if the primary is not immediately connected to the supply voltage after the discharging time. The zero-voltage instants produced during the transformer oscillations are detected in the detection device and are used in the logic device to produce the starting signal after the predetermined edge of the pulse-width-modulated signal has been encountered.

With the control signal remaining the same and with small loads, a particular number of cycles of the free transformer oscillations are permitted until the semiconductor switching element turns on again for the duration of a driving pulse. Hence, with small loads, the apparatus operates in a frequency-reduced mode.

If the predetermined edge of the pulse-width-modulated signal is produced, for a particular control signal, in each case shortly before or shortly after a zero-voltage instant, then fluctuations in the temporal spacing between the individual pulses of the starting signal can occur when there are slight fluctuations in the control signal. These fluctuations in the temporal spacing are at least in the range of half a clock period of the free transformer oscillations, since the semiconductor switching element is turned on, for example, in each case at the next zero-voltage instant after the predetermined edge has been encountered. These fluctuations result in frequency fluctuations in the starting signal, and hence frequency fluctuations (jitter) in the switching frequency, which results in audible noise effects.

To prevent such frequency fluctuations, the pulse generator is provided with a control circuit with a feedback path having a phase detector. In a frequency-reduced mode with a constant load, the control circuit compensates for small fluctuations in the control signal such that a pulse-width-modulated signal with approximately constant pulse durations is produced. The pulse-width-modulated signal is applied, for control purposes, to one input of the feedback path, an output signal which is present at an output of the feedback path and is supplied by the phase discriminator being fed back so as to be added to the control signal to form the modified control signal. The duration of the pulses of the pulse-width-modulated signal, which depend on the amplitude of the modified control signal, can thus be varied by adding an output signal of varying size to the control signal. The amplitude of the control-signal fluctuations, which can be compensated for using the control circuit, depends on the maximum amplitude of the output signal from the feedback path.

By way of example, the amplitude of the output signal depends on the temporal spacing between the predetermined edge of the pulse-width-modulated signal and the preceding or subsequent zero-voltage instant. The phase discriminator is therefore supplied with the primary signal via a second input terminal.

In a frequency-reduced mode, with relatively large loads, and hence relatively short times between two pulses of the starting signal, "jumping" of the turn-on instants between two zero-voltage instants occurring after a different number of cycles of the free transformer oscillations has a more disruptive effect than with small loads, and hence with waiting times which are longer anyway between the individual pulses of the starting signal. The phase discriminator is therefore preferably supplied with the control signal via a third input terminal in order, with relatively large loads, to achieve a larger maximum amplitude for the output signal, and thus to correct relatively large fluctuations in the control signal, than with smaller loads.

Other features which are considered as characteristic for the invention are set forth in the appended claims.

Although the invention is illustrated and described herein as embodied in an apparatus for supplying a DC voltage, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a schematic illustration of an apparatus according to the invention for supplying a DC voltage to a load R connected to output terminals AK of the apparatus. The apparatus has a transformer with a primary L1 and a secondary L2, to which a rectifier configuration GLA having output terminals with the DC voltage $U_A$ on them is connected in parallel. The simple rectifier configuration GLA shown includes a capacitor C1, connected in parallel with the output terminals, and a rectifier diode D1.

Figure 1:
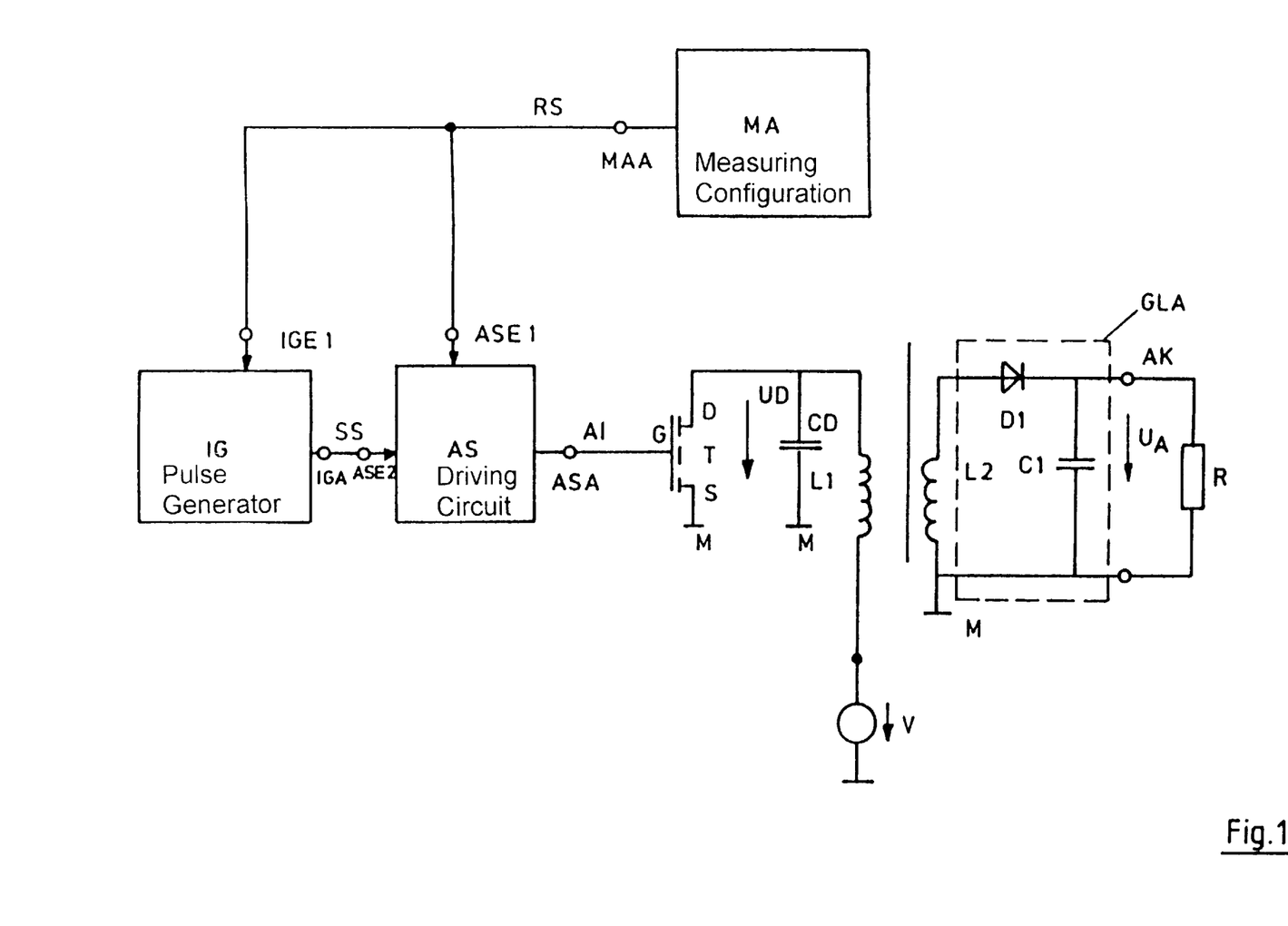
FIG. 1 is a circuit diagram of an apparatus for supplying a DC voltage according to the invention.

The primary L1 has one terminal connected to a supply potential V and another terminal connected to a reference-ground potential M via a load path D-S of a semiconductor switch element T. The semiconductor switching element T is a MOSFET. In parallel with the load path D-S of the semiconductor switching element T, there is a capacitor CD which contains, on the one hand, parasitic capacitors and, on the other hand, a capacitor, specifically connected in parallel with the load path D-S. The semiconductor switching element T is turned off and on depending on driving pulses AI which are applied to a control input G of the semiconductor switching element T and are available at an output ASA of a driving circuit AS. Without any restriction of the general nature, the following description assumes that the semiconductor switching element T is on when a driving pulse AI is applied to the control input G, and that the semiconductor switching element T is off when there is no driving pulse AI at the control input G. A duration of the driving pulses AI produced in the driving circuit AS depends on a load-dependent analog control signal RS which is applied to a first input terminal ASE1 of the driving circuit AS and is available at an output MAA of a measuring configuration MA.

The driving circuit AS has a second input terminal ASE2, which is connected to an output terminal IGA of a pulse generator IG. A starting signal SS which is supplied by the pulse generator IG and is applied to the second input terminal ASE2 of the driving circuit AS determines the instants at which each of the individual driving pulses AI produced by the driving circuit AS starts, and thus determines the turn-on instants of the semiconductor switching element T. The starting signal SS formed by the pulse generator IG is preferably in pulse form, with the duration of the individual pulses preferably being shorter than the minimum duration of the driving pulses AI. The temporal spacing between two pulses of the starting signal SS depends on the load-dependent analog control signal RS, which is also applied to a first input terminal IGE1 of the pulse generator IG.

Figure 2:
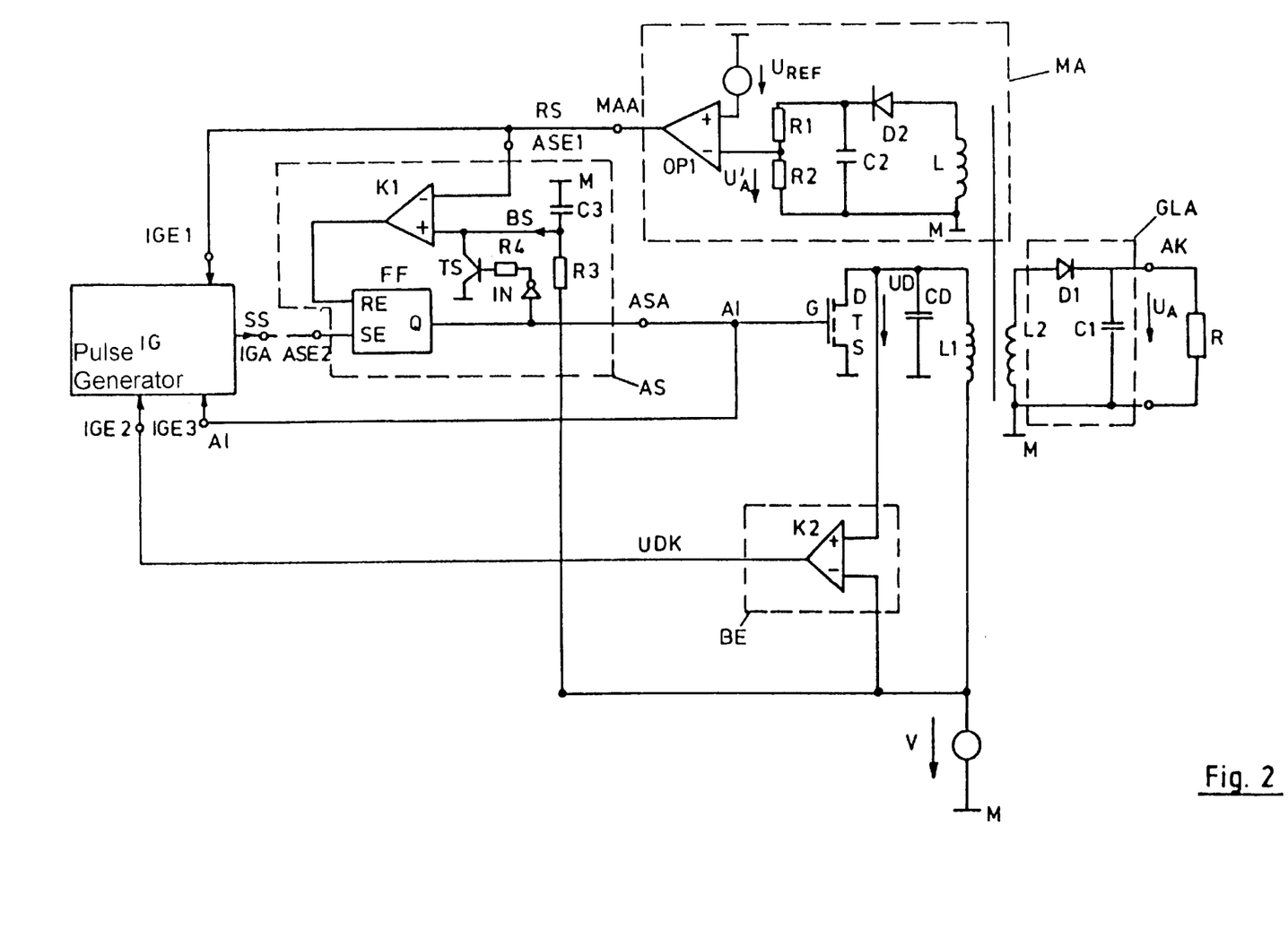
FIG. 2 is a circuit diagram of the apparatus with a measuring configuration and a driving circuit.

FIG. 2 shows a special embodiment of the apparatus shown in FIG. 1, the driving circuit AS and the measuring configuration MA being shown in detail by way of example to aid understanding.

The measuring configuration MA shown has an inductor L that is inductively coupled to the secondary L2 of the transformer. Connected in parallel with the inductor L, there is a rectifier configuration containing a diode D2 and a capacitor C2, and a voltage proportional to the output voltage $U_A$ can be tapped off at the capacitor C2. In the example shown, the measuring configuration MA also has a voltage divider R1, R2 which divides up the voltage across the capacitor C2 into a voltage $U'_A$ which is likewise proportional to the output voltage $U_A$, the voltage $U'_A$ being supplied to one input terminal of an operational amplifier OP1. The control signal RS present at the output terminal MAA of the measuring configuration MA is produced in the operational amplifier OP1 as a result of the voltage $U'_A$ being subtracted from a reference voltage $U_{REF}$, with subsequent amplification of the difference signal $U_{REF}-U'_A$. Fluctuations in the output voltage $U_A$ thus cause fluctuations in the control signal RS, the control signal RS rising when the output voltage $U_A$ falls, and vice versa.

On account of the direct dependency of the control signal RS on the output voltage $U_A$ in the measuring configuration MA shown, a large gain is required for the operational amplifier OP1 in order to cause large fluctuations in the control signal RS for merely small fluctuations in the output signal $U_A$. The proportional response of the measuring configuration MA shown causes the control signal RS to change rapidly when the output signal $U_A$ changes, but causes the output voltage $U_A$ to deviate, though this deviation may be small given an appropriate gain for the operational amplifier OP1, from a predetermined nominal value. Such a control deviation can be prevented, for example, if an integral controller or proportional/integral controller known per se is used as the measuring configuration MA.

The driving circuit AS shown by way of example in FIG. 2 contains a comparator K1, an RS flip-flop FF, a switching transistor TS, which has a control input connected via an inverter IN and a resistor R4 to an output of the flip-flop FF, and a capacitor C3, one of whose terminals is connected to reference-ground potential M and another of whose terminals is connected to a supply potential V via a resistor R3. A reset input RE of the RS flip-flop FF is connected to an output of the comparator K1, and a set input SE is connected to the second input terminal ASE2. The output Q of the flip-flop FF is connected to the output terminal ASA of the driving circuit AS. The driving circuit AS, shown by way of example, operates as described below.

At the start of a pulse of the starting signal SS, the flip-flop FF is set and hence the start of a driving pulse AI is defined. The switching transistor TS is turned off and the capacitor C3 is charged via the resistor R3 until a reference signal BS, which can be tapped off at the capacitor C3, reaches the value of the control signal RS. The flip-flop FF is then reset by a signal present at the output of the comparator K1, and the driving pulse AI is ended. The duration of the driving pulses AI depends on the amplitude of the control signal RS. The larger the control signal RS, the longer it takes until the capacitor C3 has charged to the value of the control signal RS after the flip-flop FF has been set, and vice versa.

In the apparatus shown, with the predetermined load R, the output voltage $U_A$ depends on the power transmitted from the primary L1 to the secondary L2. The power consumed by the primary L1 depends on the duration of the driving pulses AI and on the switching frequency at which the driving pulses AI are produced. Over the duration of the driving pulse AI, and hence when the semiconductor switching element T is on, the primary L1 consumes energy via the supply voltage V, and at the end of the driving pulse AI, when the semiconductor switch T is off, it transmits this energy to the secondary L2. In this case, the duration of the driving pulses AI corresponds to the charging time, during which the primary L1 consumes energy. The discharging time, during which the primary L1 transmits energy to the secondary L2, is dependent, among other things, on the energy stored in the primary L1 during the charging time.

To reduce switching losses, and on account of the risk of transformer saturation, it is important to prevent a new driving pulse AI from being produced during the discharging time in order to charge the primary L1 further. Information about the discharge state of the primary L1 can be obtained, for example, from a primary signal UD which can be tapped off in parallel with the load path D-S of the semiconductor element T.

Figure 8:
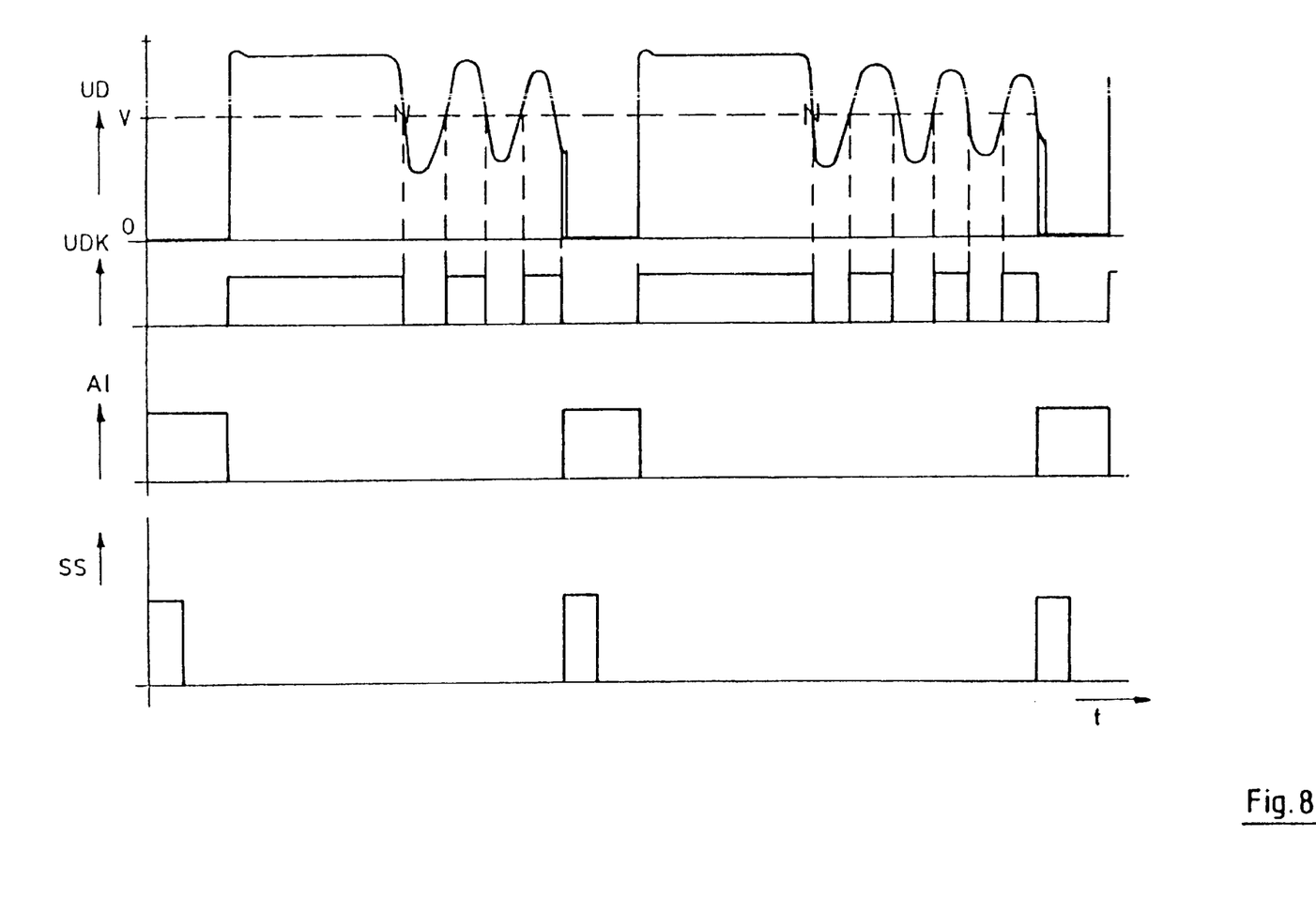
FIGS. 8–10 are pulse diagrams for selected signals denoted in the figures.

FIG. 8 shows a typical curve for a primary signal UD as a function of the starting signal SS and the driving pulses AI. If a pulse of the starting signal SS is applied to the second input terminal ASE2 of the driving circuit AS, a driving pulse AI is produced whose duration depends on the load-dependent control signal RS. The primary signal UD corresponds to the reference-ground potential M for as long as a driving pulse AI is applied to the control input G of the semiconductor switching element T, the reference-ground potential M being assumed below to be ground, without any restriction of the general nature. At the end of the driving pulse AI, the primary signal UD jumps to a value resulting from the sum of the supply voltage V and the voltage induced in the primary L1. The primary signal UD remains approximately at this level for as long as energy is transmitted to the secondary L2. The end of the discharging time is characterized by a drop in the primary signal UD to the value of the supply voltage V, with no voltage being present on the primary L1 at this instant.

If the semiconductor switching element T is not turned on again immediately at the end of the discharging time, so-called free transformer oscillations arise, as shown in FIG. 8, whose clock period depends on the inductance of the primary L1 and on the capacitor CD.

Whereas, in known apparatuses, the semiconductor switching element T is turned on immediately at the end of the discharging time, free transformer oscillations are permitted in the apparatus according to the invention, on the basis of the control signal RS, until a new driving pulse AI is produced at the instigation of the starting signal SS. Preferably, the semiconductor switching element T is turned on at instants at which the primary L1 is free of voltage, or shortly after such instants, these instants being called zero-voltage instants below. It is preferably turned on at such zero-voltage instants, which occur at a falling edge of the primary signal UD. Information about zero-voltage instants can also be obtained, besides from the primary signal UD shown in FIG. 2, from signals produced, for example, by tapping off a voltage directly at the primary L1, by tapping off a voltage at the inductor L of the measuring configuration MA or by tapping off a voltage at the secondary L2.

The information about zero-voltage instants of the primary L1 is supplied to the pulse generator IG in the illustrated examples as a weighted primary signal UDK via a second input terminal IGE2. FIG. 8 shows, by way of example, a weighted primary signal UDK for the primary signal UD shown there, the weighted primary signal UDK having only two levels and the weighted primary signal UDK illustrated changing from a lower level to an upper level with a rising edge of the primary signal UD at the respective zero-voltage instant, and changing from the upper level to the lower level with a falling edge of the primary signal UD at the respective zero-voltage instant. Such a weighted primary signal UDK can be generated using an assessor unit BE shown in FIG. 2, for example, which essentially has a comparator K2 which compares the primary signal UD with the level of the supply potential V.

The pulse generator IG shown in FIG. 2 is also supplied with the driving pulses AI via a third input terminal IGE3, the driving pulses AI serving to enable the pulse generator IG for the purpose of producing the pulses of the starting signal SS.

Figure 3:
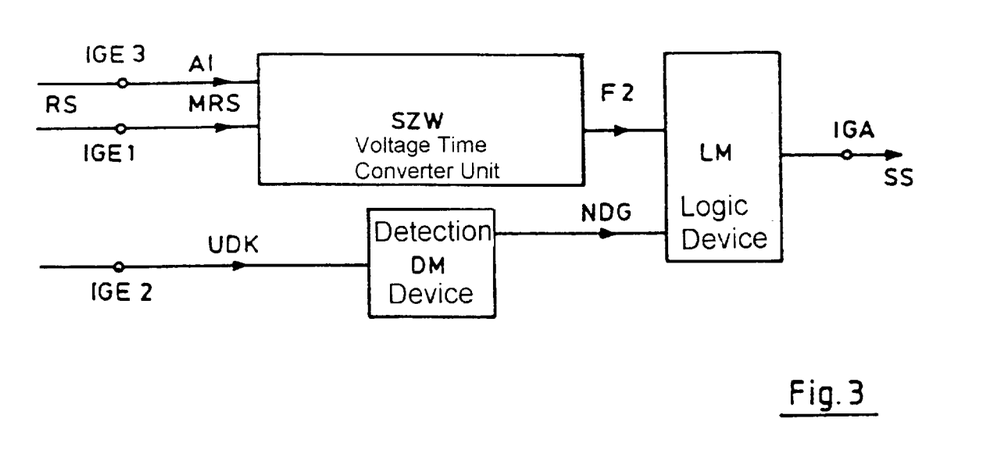
FIG. 3 is a block circuit diagram of an embodiment of a phase discriminator.
Figure 4:
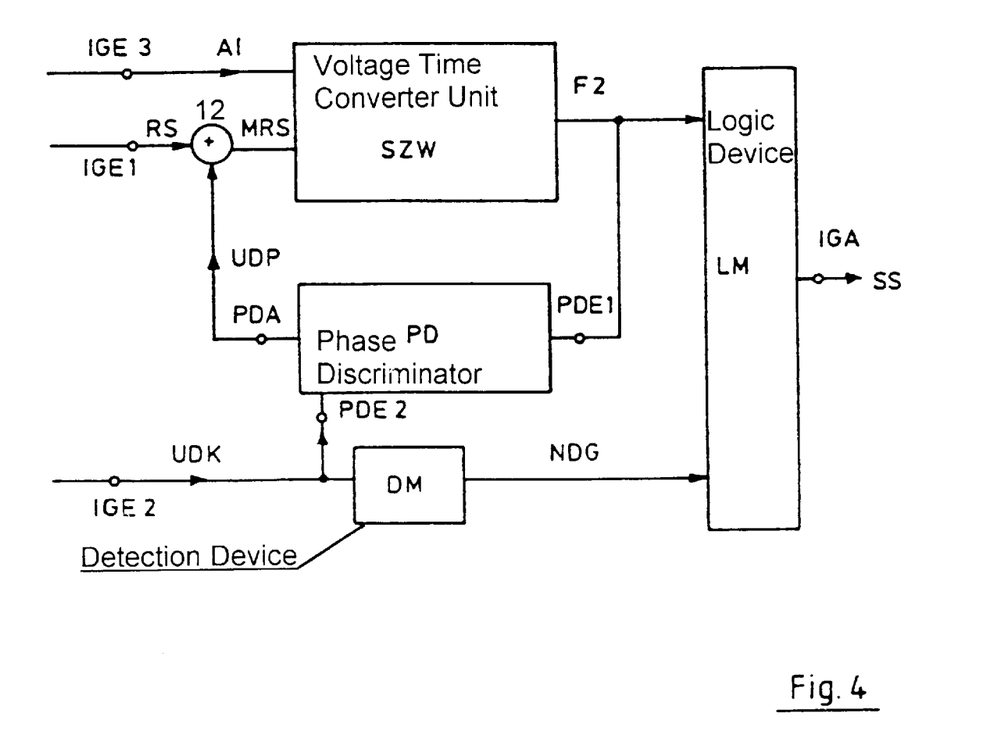
FIG. 4 is a block circuit diagram of an embodiment of the phase discriminator with a feedback path.
Figure 5:
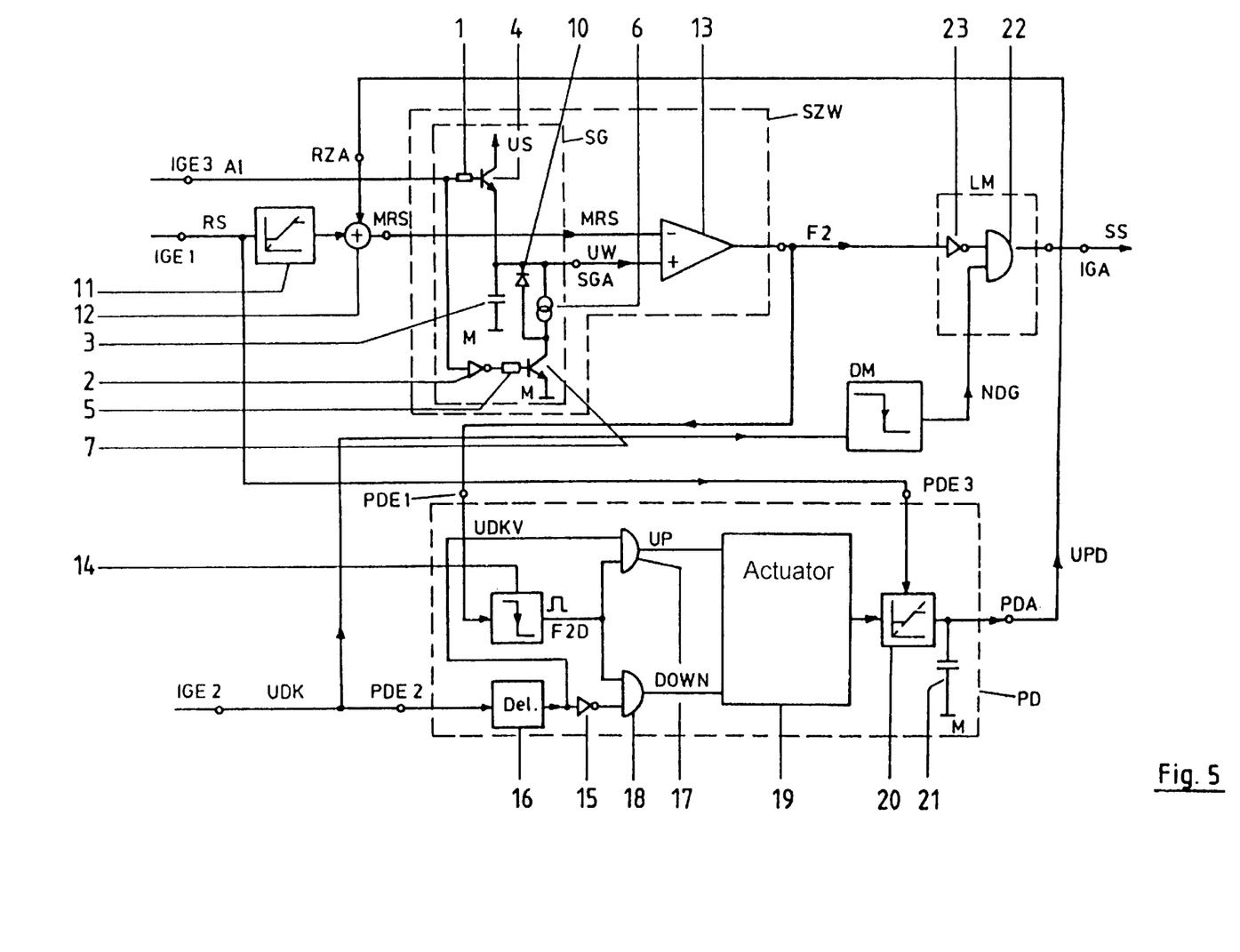
FIG. 5 is a detailed circuit diagram of the embodiment of the phase discriminator with a feedback path.

FIGS. 3 and 4 show a block diagram of feasible embodiments of the pulse generator IG, and the pulse generator shown in FIG. 4, which contains all the units of the pulse generator shown in FIG. 3, is essentially shown in detail in FIG. 5. The pulse generator IG has a voltage/time converter unit SZW that is supplied with a modified control signal MRS at an input terminal. The modified control signal MRS can be the control signal RS supplied to the pulse generator IG at the first input terminal IGE1, as shown in FIG. 3, or the modified control signal MRS can be formed in an adding unit 12 from the control signal RS and an output signal UPD which is present at an output of a feedback path.

At an output terminal of the voltage/time converter unit SZW, a pulse-width-modulated signal F2 is available, a duration of the individual pulses of the pulse-width-modulated signal F2 depend on the amplitude of the modified control signal MRS. At a second input of the voltage/time converter unit SZW, connected to the third input terminal IGE3 of the pulse generator IG, an enable signal is applied which defines the start of the individual pulses of the pulse-width-modulated signal F2. The enable signal preferably contains the driving pulses AI, with the individual pulses of the pulse-width-modulated signal F2 preferably starting at a falling edge of the driving pulses AI.

The pulse generator IG also has a detection device DM, one input terminal of which is connected to the second input terminal IGE2 of the pulse generator IG and which is thus supplied with the weighted primary signal UDK. An output terminal of the detection device DM provides a pulse signal NDG. The individual pulses, which are preferably of the same length, of the pulse signal NDG mark rising or falling edges of the weighted primary signal UDK, and hence zero-voltage instants of the primary L1. The detection device DM is preferably configured such that it produces a pulse signal NDG which marks only falling edges of the weighted primary signal UDK with a pulse. The pulse-width-modulated signal F2 and the pulse signal NDG are supplied to a logic device LM which has an output which is connected to the output IGA of the pulse generator IG and provides the starting signal SS.

The logic device LM produce pulses of the starting signal SS in each case after a predetermined edge of the pulse-width-modulated signal F2 has been encountered, preferably at the next pulse of the pulse signal NDG. The pulse-width-modulated signal F2 thus determines the earliest possible instant after which a pulse of the starting signal SS can be produced, while the pulse signal NDG defines the actual instant.

FIG. 5 shows an embodiment of the voltage/time converter unit SZW that essentially contains a comparator 13 having an output that provides the pulse-width-modulated signal F2, and a signal generator SG. The signal generator SG provides a reference signal UW that is supplied to a positive input of the comparator 13, the modified control signal MRS being applied to a negative input of the comparator 13. The signal generator SG has a first transistor 4, which is connected to a load path between a second supply potential US and an electrode of a capacitor 3, the other electrode of the capacitor 3 being connected to a reference-ground potential M. A control input of the transistor 4 has an enable signal applied to it via a resistor 1, the enable signal contains the driving pulses AI in the example shown. The first terminal of the capacitor 3 is connected to an output terminal SGA of the signal generator SG. The signal generator SG also has a second transistor 7, which is connected to a load path between the reference-ground potential M and a first terminal of a current source 6, a second terminal of the current source 6 being connected to the output terminal SGA. A control electrode of the second transistor 7 has the enable signal applied to it via an inverter 2 and a resistor 5. The voltage/time converter unit illustrated operates as now described.

Over the duration of the driving pulse AI, the first transistor 4 is turned on and the second transistor 7 is turned off. The capacitor 3 is charged to a value of the second supply voltage US over the duration of a driving pulse AI. At the end of the driving pulse AI, the first transistor 4 is turned off, the second transistor 7 is turned on and the capacitor 3 is discharged via the current source 6 and the second transistor 7. The output of the comparator 13 rises to an upper signal level if the reference signal UW exceeds the modified control signal MRS, and falls to a lower signal level if the modified control signal MRS exceeds the reference signal UW.

Figure 9:
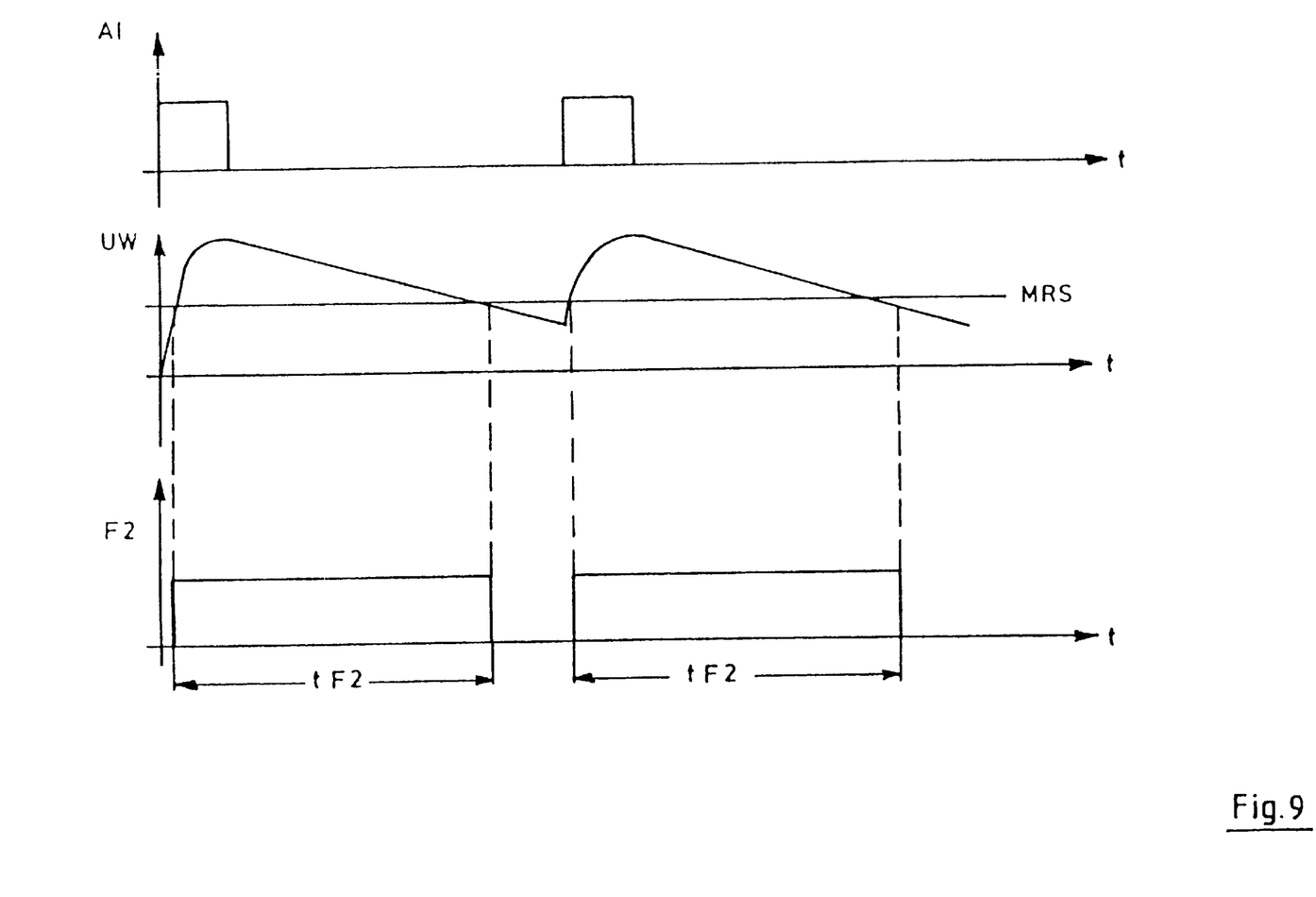
Figure 11:
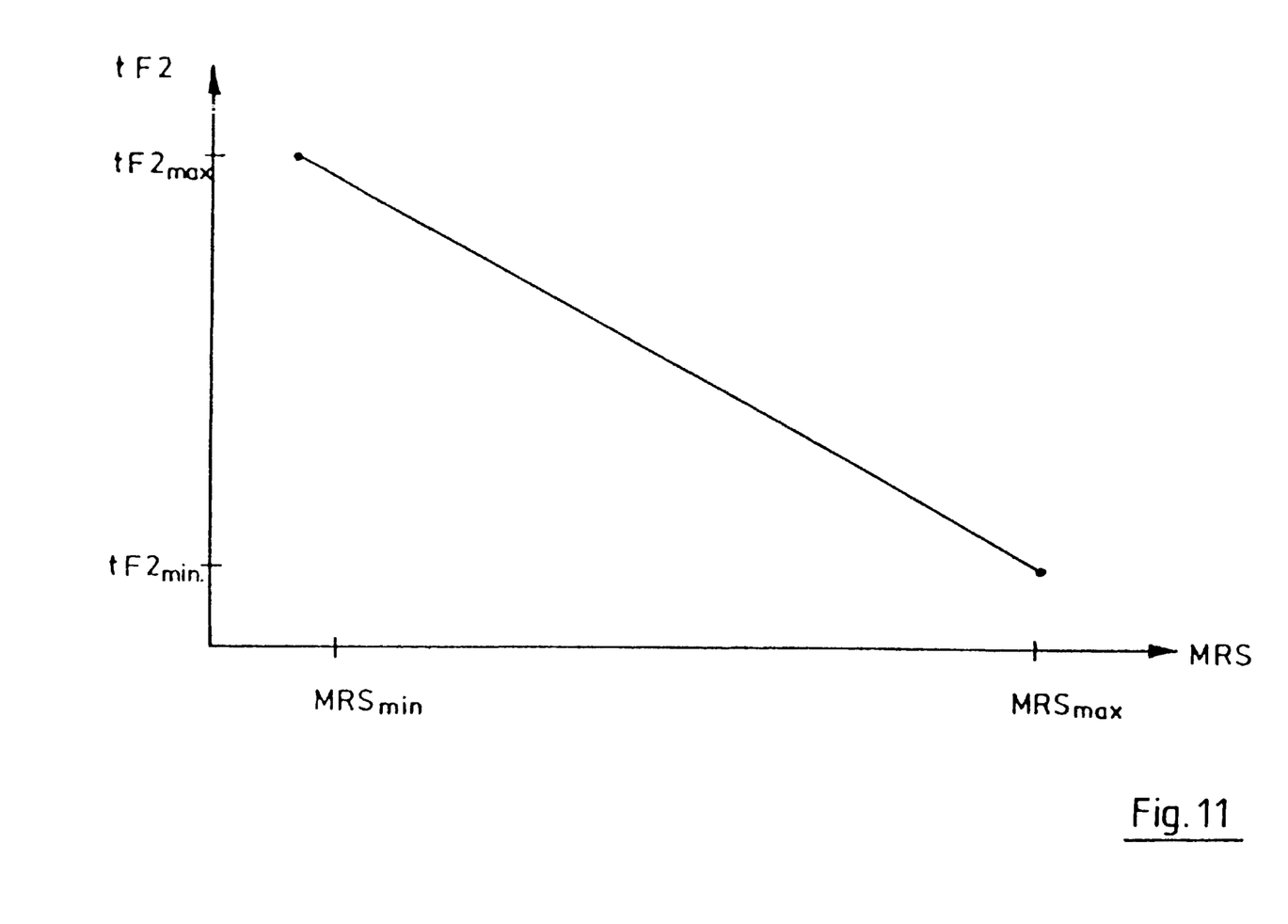
FIGS. 11–12 are graphs of selected signals denoted in the figures.

FIG. 9 shows a waveform of a pulse of the pulse-width-modulated signal F2 as a function of the amplitude of the modified control signal MRS and of the reference signal UW. Assuming that the amplitude of the reference signal UW rises very quickly after the occurrence of the driving pulse AI, the duration tF2 of the illustrated pulse of the pulse-width-modulated signal F2 is proportional to the amplitude of the modified control signal MRS. The duration tF2 of the pulse, and hence the waiting time between two pulses of the starting signal SS, is larger the smaller the modified control signal MRS, and vice versa. The dependency of the duration of the pulses of the pulse-width-modulated signal F2 on the modified control signal MRS is shown schematically in FIG. 11, with the assumption that the modified control signal MRS is limited at the bottom to a minimum signal $MRS_{min}$ and at the top to a maximum signal $MRS_{max}$, so that a minimum pulse duration $tF2_{min}$ and a maximum pulse duration $tF2_{max}$ are produced.

The logic device LM shown in FIG. 5 has an AND gate 22 and an inverter 23, which is connected upstream of one input of the AND gate 22. By ANDing the inverted pulse-width-modulated signal F2 and the pulse signal NDG provided by the detection device DM, a pulse of the starting signal SS is produced in the logic device LM. A pulse of the starting signal is produced in the logic device LM shown if a pulse of the pulse signal NDG is applied to the input of the logic device LM at the end of a pulse of the pulse-width-modulated signal F2. The pulse-width-modulated signal F2 thus stipulates the minimum waiting time between two pulses of the starting signal SS, while the actual turn-on instant of a starting signal pulse depends on the pulse signal NDG.

With the load remaining the same and with slight fluctuations in the control signal RS, to prevent the fluctuations in the control signal RS from resulting in fluctuations in the pulse duration tF2 of the pulse-width-modulated signal F2, and hence in undesirable fluctuations between the spacings of the individual pulses of the starting signal SS, and hence in fluctuations in the switching frequency, the pulse generators IG shown in FIGS. 4 and 5 are provided with a feedback path having a phase discriminator PD. The phase discriminator PD has a first input terminal PDE1, with the pulse-width-modulated signal F2 applied to it, and an output terminal PDA which provides an output signal UPD, the output signal UPD being added to the control signal RS by the adding unit 12. The output signal UPD compensates for fluctuations in the control signal RS in such a way that, for control signal RS fluctuations within a predetermined range, a constant modified control signal MRS, and hence, for this control signal range, a constant duration of the pulses of the pulse-width-modulated signal F2, is produced. If the starting signal SS is always to be produced at or shortly after a falling edge of the primary signal UD, the output signal UDP is preferably produced in the phase discriminator PD such that, in the steady state, the modified control signal MRS is produced for which the individual pulses of the pulse-width-modulated signal F2 end at a rising edge of the primary signal UD.

To produce the output signal UDP, the phase discriminator PD is supplied with the weighted primary signal UDK via a second input terminal PDE2. In the phase discriminator PD shown in FIG. 5, the amplitude of the output signal UDP is dependent on the temporal spacing between a rising edge of the weighted primary signal UDK and a falling edge of the pulse-width-modulated signal F2.

The phase discriminator PD shown has a delay element 16, a differentiating device 14, an inverter 15, two AND gates 17 and 18, an actuator 19 with a downstream voltage limiter 20, and a capacitor 21 connected between the output terminal PDA and the reference-ground potential M.

Figure 10:
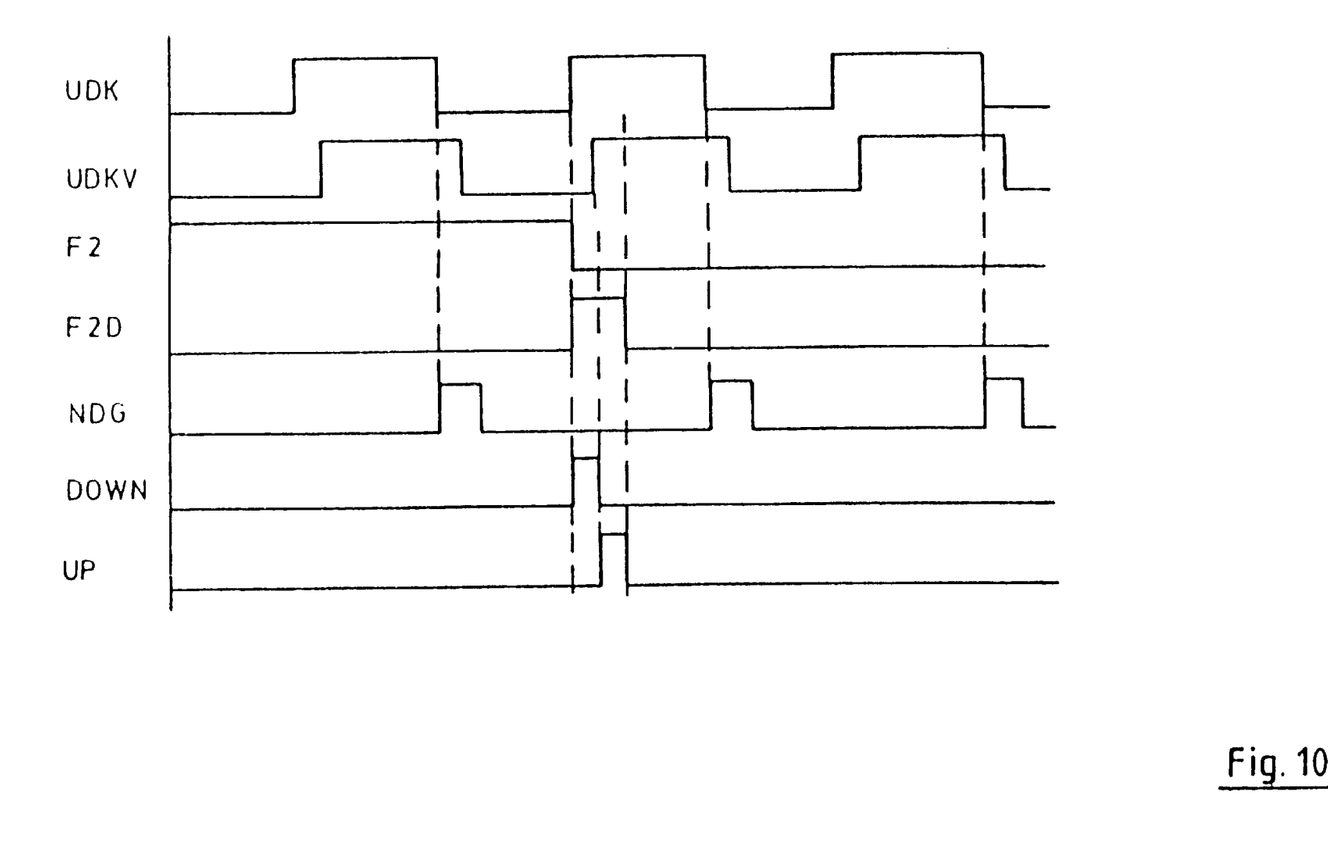

The way in which the phase discriminator PD shown operates can be seen in FIG. 10, where the signals shown in FIG. 5 are plotted against time. A signal UP applied to an input of the actuator 19 is produced by ANDing a differentiator signal F2D supplied by the differentiating device 14 with a signal UDKV produced from the weighted primary signal UDK by delaying it in the delay element 16. An input of the differentiating device 14 has the pulse-width-modulated signal F2 applied to it, with pulses of the differentiator signal F2D in each case marking falling edges of the pulse-width-modulated signal F2 in the example shown. In this case, the width of the individual pulses should preferably be chosen to be smaller than the clock period of the free transformer oscillations. A signal DOWN applied to a second input of the actuator 19 is produced by ANDing the differentiator signal F2D with a signal produced from the weighted primary signal UDK by delaying and subsequently inverting it. As can be seen from FIG. 10, the duration of the individual pulses of the signal UP and of the signal DOWN depends on the temporal position of a falling edge of the pulse-width-modulated signal F2 and of a rising edge of the weighted primary signal UDK. If the timing of these two edges is matched, the pulses of the signals UP and DOWN are of the same length.

The delay for the delay carried out in the delay element 16 on the weighted primary signal UDK is preferably half the duration of one pulse of the differentiator signal F2D.

If the temporal position of the rising edge of the weighted primary signal UDK and of the falling edge of the pulse-width-modulated signal F2 changes, then the ratio of the pulse durations of the individual pulses of the signals UP and DOWN changes. The actuator 19, which has an integrating control response, changes the output signal UPD, which can be tapped off at the capacitor 21 of the phase discriminator PD. If, by way of example, the duration of the pulses of the signal UP exceeds the duration of the pulses of the signal DOWN, the capacitor 21 is charged again, and the output signal UPD rises. The output signal UPD changes until a modified control signal MRS is established, in which case the falling edge of the pulse-width-modulated signal F2 again matches a rising edge of the weighted primary signal UDK.

Figure 7:
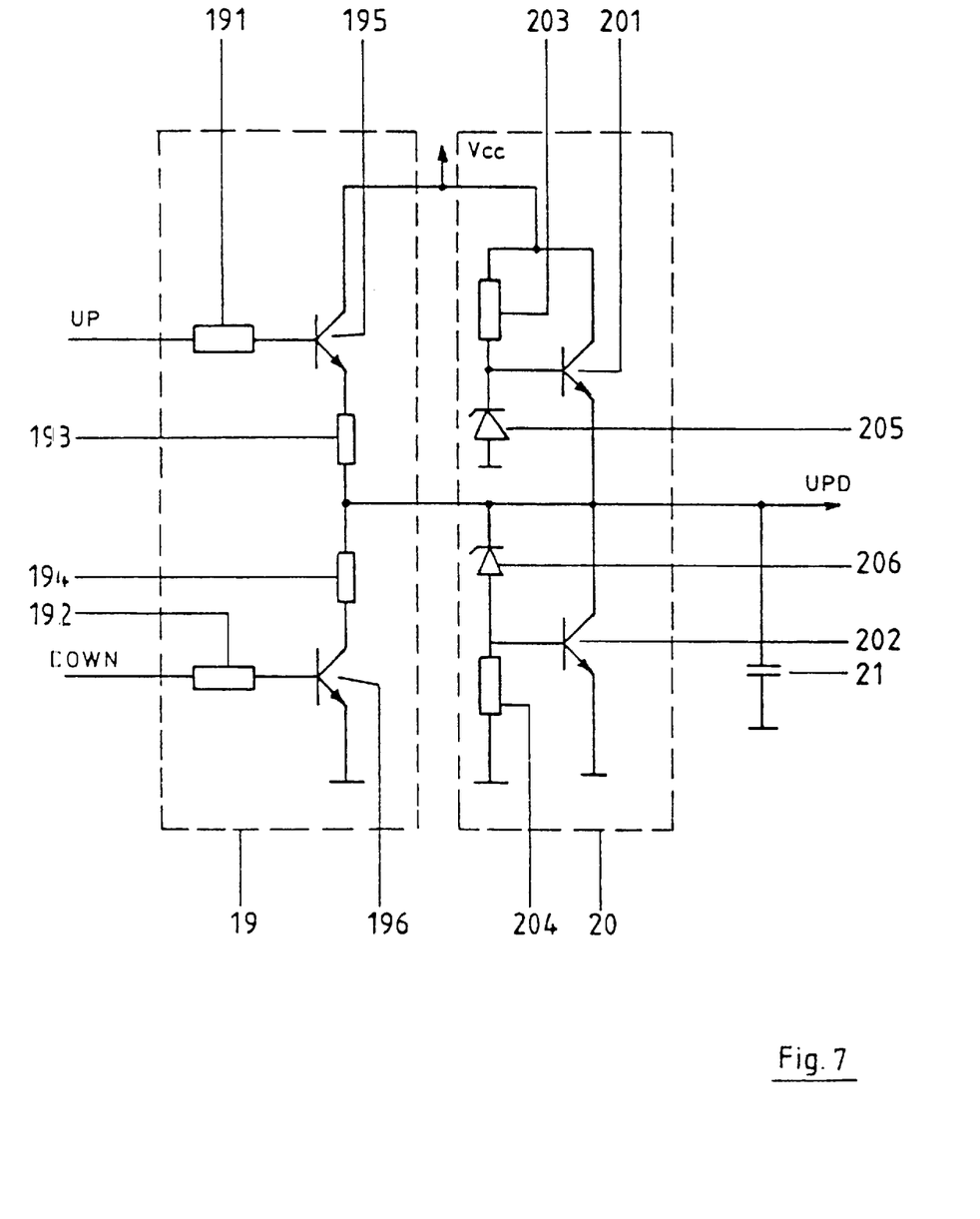
FIG. 7 is a circuit diagram of an embodiment of an actuator with a voltage limiter.

An embodiment of the actuator 19 described and of the downstream voltage limiter 20 is shown in FIG. 7. The reference numerals 191, 192, 193, 194, 203 and 204 denote resistors here, and the reference numerals 195, 196, 201 and 202 denote transistors, the reference symbols 205 and 206 denote zener diodes and the reference symbol $V_{cc}$ denotes a third supply voltage.

The operation of the voltage limiter 20 corresponds to that of a voltage limiter 11 shown in FIG. 5, which is connected downstream of the first input terminal IGE1 of the pulse generator IG to limit the control signal RS. The phase discriminator PD shown in FIG. 5 has a third input terminal PDE3 (not shown in FIG. 4), which has the control signal RS applied to it. The control signal RS uses the voltage limiter 20 to affect the upper and lower limit values of the output signal UPD; an input at which the voltage limiter 20 has the control signal RS supplied to it is not shown in FIG. 7. The level of the fluctuations in the control signal RS, which can be compensated for by the output signal UPD of the phase discriminator PD, depends on the amplitude of the output signal UPD. If fluctuations in the control signal RS can no longer be corrected by the output signal UPD, then, in frequency-reduced mode, fluctuations in the switching frequency occur as a result of the pulses of the starting signal SS being produced after a different number of cycles of the free transformer oscillations. These oscillations are more severe at a high switching frequency, and thus with a large control signal RS, than at a lower switching frequency with a smaller control signal RS. A relatively large fluctuation range with a large control signal can be corrected by varying the maximum amplitude of the output signal UPD using the control signal RS in the voltage limiter 20.

Figure 12:
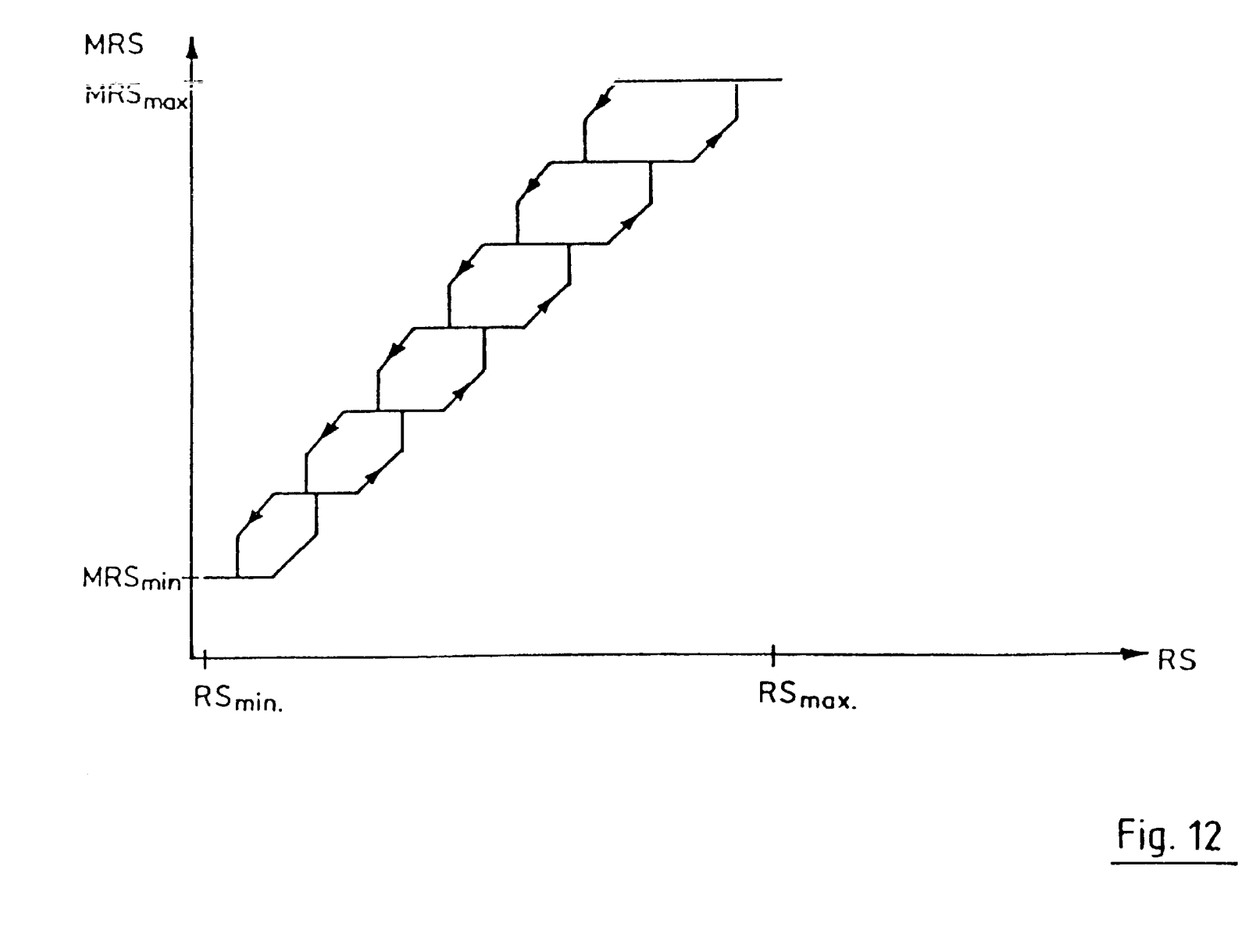

FIG. 12 shows the dependency of the modified control signal MRS on the control signal RS when a control circuit with the phase discriminator PD is used in the pulse generator. In this case, the modified control signal MRS is constant in each case for predetermined intervals of the control signal RS, the length of the intervals over which the modified control signal MRS is constant increasing with an increasing control signal RS. The arrows indicate the direction in which the modified control signal MRS changes for a rising and a falling control signal RS.

Figure 6:
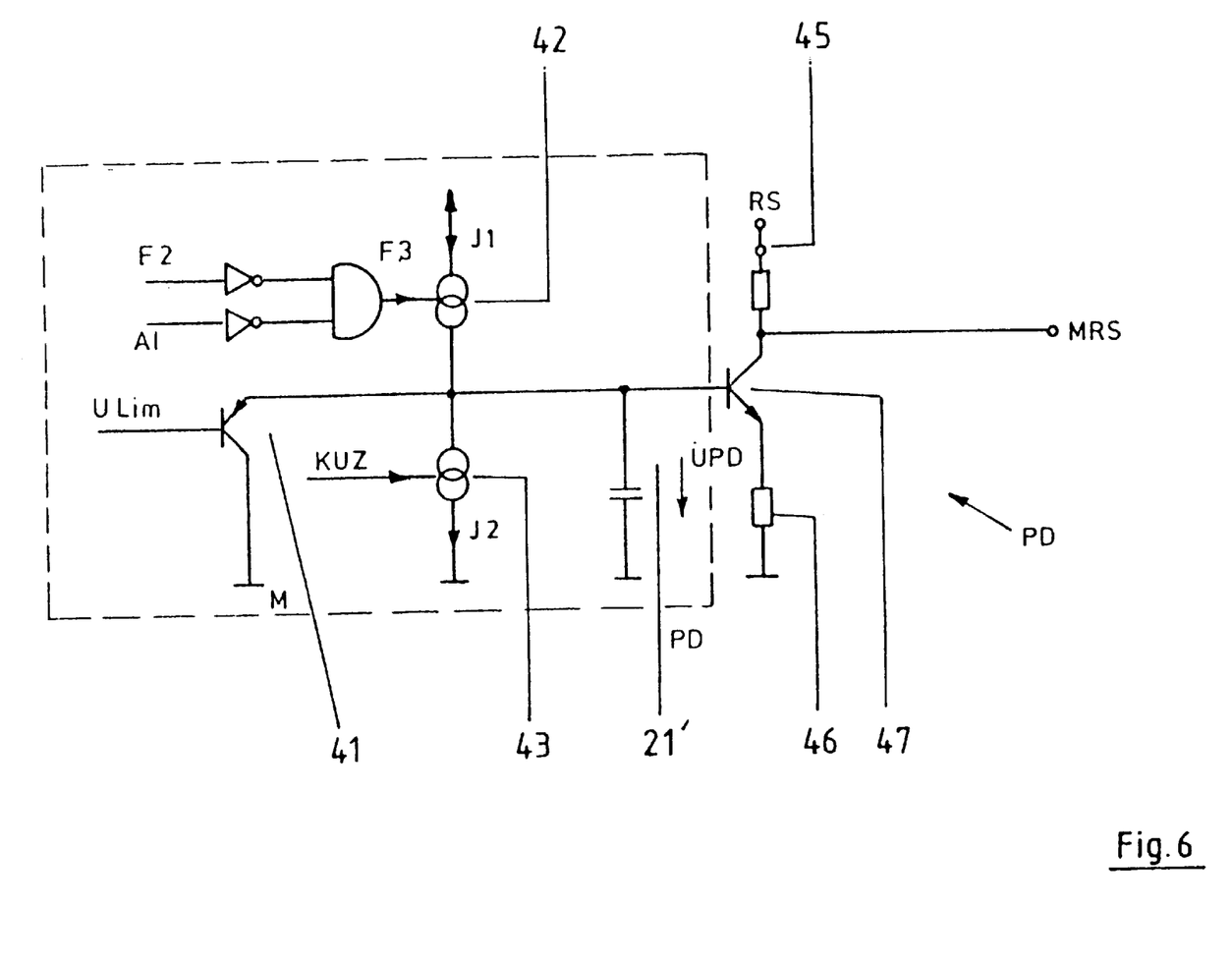
FIG. 6 is a circuit diagram of another embodiment of the phase discriminator.

FIG. 6 shows a particularly space-saving circuit configuration, which is also simple to implement, of the feedback path with the phase discriminator PD. In the functional unit shown in FIG. 6, the function of the adding unit 12 shown in FIG. 5 is performed by a transistor 47, which has an emitter electrode connected to the reference-ground potential M via a resistor 46 and which is connected via a further resistor 45 to the first input terminal IGE1, which has the control signal RS applied to it. The modified control signal MRS can be tapped off at a collector electrode of the transistor 47. The phase discriminator PD shown in FIG. 6 has a capacitor 21' whose function corresponds to that of the capacitor 21 shown in FIG. 5. The output voltage UPD across the capacitor 21' is applied to a control electrode of the transistor 47.

The phase discriminator PD also has a first and a second current source J1, J2 and a limiting transistor 41. A load path of the limiting transistor 41 is connected in parallel with the capacitor 21', and a limiting signal ULim applied to a control electrode of the limiting transistor 41 can be used to set the maximum output voltage across the capacitor 21'. The limiting signal ULim is produced as a constant signal in the phase discriminator PD or is dependent on the control signal RS, depending on the embodiment. The operation of the limiting transistor 41 corresponds to the operation of the voltage limiter 20 shown in FIG. 5. The capacitor 21' is continuously discharged over a lengthy period of time via the parallel-connected second current source J2, which is turned on cyclically by a first control signal KUZ. The first current source J1, which is turned on depending on a second control signal F3, is used to charge the capacitor 21' continuously over a lengthy period of time. Depending on the ratio of a first control signal KUZ to a second control signal F3, the output voltage UPD rises or falls or the output voltage UPD remains constant. The second control signal F3 is preferably produced on the basis of the pulse-width-modulated signal F2 and the driving pulses AI. The durations of the pulses of the second control signal F3 preferably correspond to the times between the end of the pulses of the pulse-width-modulated signal F2 and the start of the next driving pulse AI.

Figure 13:
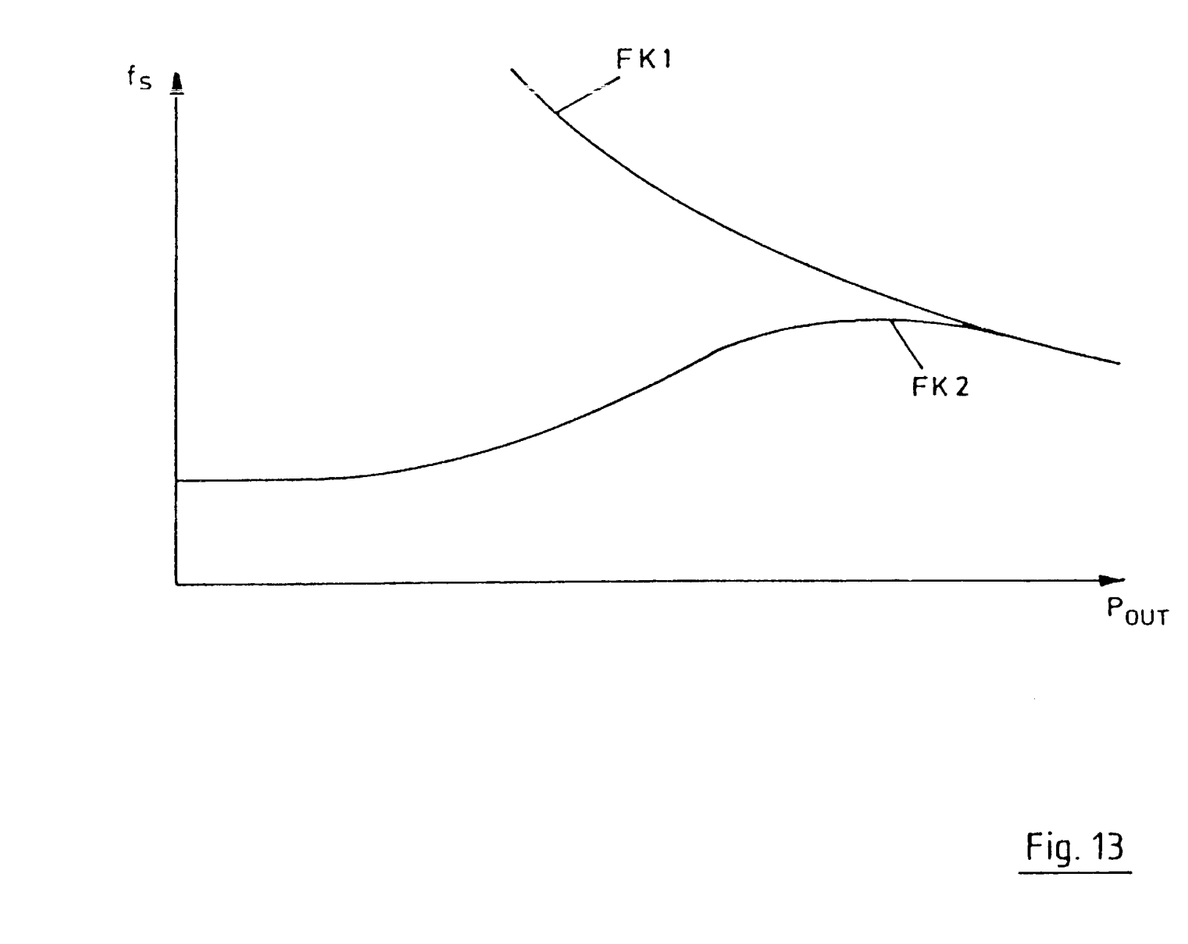
FIG. 13 is a graph of a load-dependent curve for a switching frequency.

Finally, FIG. 13 plots the curve for the switching frequency as a function of a power Pout transmitted to the load. A first curve FK1 shows the frequency profile of previously used switched-mode power supplies in which the switching frequency rises with decreasing power $P_{out}$ or a decreasing load. A second curve shows the profile of the switching frequency of a switched-mode power supply according to the invention, in which the switching frequency for decreasing loads endeavors to oppose a fixed value; for this illustration, it is assumed that no phase discriminator is used in the pulse generator.

I claim:

1. An apparatus having output terminals for supplying a DC voltage to a load connected the output terminals of the apparatus, comprising:

a measuring configuration for generating and outputting an analog load-dependent control signal;

a pulse generator having an input terminal receiving the analog load-dependent control signal and an output terminal, said pulse generator generating and outputting at said output terminal a pulsed starting signal on a basis of the analog load-dependent control signal, a temporal spacing of individual pulses of the pulsed starting signal being influenced by the analog load-dependent control signal;

a driving circuit for generating and outputting driving pulses, said driving circuit having a first input terminal receiving the analog load-dependent control signal from said measuring configuration, the analog load-dependent control signal governing a duration of the driving pulses, and a second input terminal connected to said output terminal of said pulse generator and receiving the pulsed starting signal for defining turn-on instants of the driving pulses;

a supply voltage;

a transformer having a primary side connected to said supply voltage; and a semiconductor switching element having a control input receiving the driving pulses from said driving circuit, said driving pulses controlling a clocked application of said supply voltage to said primary side of said transformer on a basis of a sequence of the driving pulses applied to said control input.

2. The apparatus according to claim 1, wherein said pulse generator contains a voltage/time converter unit having an output terminal and an input terminal receiving a modified control signal having an amplitude, the modified control signal being dependent on the analog load-dependent control signal, said voltage/time converter unit generating a pulse-width-modulated signal releasing the pulsed starting signal on a basis of the amplitude of the modified control signal.

3. The apparatus according to claim 2, wherein the the modified control signal is the analog load-dependent control signal.

4. The apparatus according to claim 2, wherein said pulse generator has a detection device for detecting instants at which said primary side is at zero voltage and a logic device receiving the pulse-width-modulated signal from said voltage/time converter unit and turning on the pulsed starting signal after a predetermined edge of the pulse-width-modulated signal has been encountered at one of the instants at which said primary side is at zero voltage.

5. The apparatus according to claim 4, wherein said logic device turns on the pulsed starting signal after one of the instants at which said primary side is at zero voltage.

6. The apparatus according to claim 4, wherein the predetermined edge is a falling edge of the pulse-width-modulated signal.

7. The apparatus according to claim 4, wherein said detection device outputs a pulse signal, and said logic device has an AND gate receiving the pulse-width-modulated signal from said voltage/time converter unit and the pulse signal from said detection device for generating the pulsed starting signal.

8. The apparatus according to claim 4, wherein said pulse generator has a further input terminal connected to said detection device and receives a primary signal, said detection device generating a pulse signal in dependence on the primary signal.

9. The apparatus according to claim 4, wherein said pulse generator has an adding unit and a feedback path for feeding back the pulse-width-modulated signal present at said output terminal of said voltage/time converter unit, said feedback path including a phase discriminator having an output terminal outputting an output signal received by said adding unit, said adding unit also receiving said analog load-dependent control signal and forming the modified control signal from the analog load-dependent control signal and the output signal from said phase discriminator.

10. The apparatus according to claim 9, characterized in that the phase discriminator has an input terminal receiving a primary signal, an amplitude of the output signal present at said output terminal of said phase discriminator is dependent on a mutual temporal spacing between two edges of the pulse-width-modulating signal from said voltage/time converter unit and of the primary signal.

11. The apparatus according to claim 10, wherein said phase discriminator has a further input terminal receiving the analog load-dependent control signal which influences a maximum amplitude of the output signal of the phase discriminator.

12. The apparatus according to claim 2, wherein said pulse generator has a further input terminal receiving a further starting signal, the further starting signal defining starting instants of individual pulses of the pulse-width-modulated signal.

13. The apparatus according to claim 12, wherein the further second starting signal is dependent on the driving pulses.

14. The apparatus according to claim 1, wherein said switching element is conducting during the duration of the driving pulses.

\* \* \* \* \*